United States Patent [19]

Kato

[11] Patent Number: 5,991,445
[45] Date of Patent: Nov. 23, 1999

[54] IMAGE PROCESSING APPARATUS

[75] Inventor: Masato Kato, Inagi, Japan

[73] Assignee: Canon Kabushiki Kaisha, Tokyo, Japan

[21] Appl. No.: 08/888,792

[22] Filed: Jul. 7, 1997

Related U.S. Application Data

[63] Continuation of application No. 08/493,999, Jun. 23, 1995, abandoned.

[30] Foreign Application Priority Data

Jun. 27, 1994 [JP] Japan .................................. 6-144607

[51] Int. Cl.$^6$ ...................................... G06K 9/36
[52] U.S. Cl. .......................... 382/232; 382/238; 382/239; 371/35
[58] Field of Search .................................... 382/238, 232, 382/239; 348/402, 616, 384, 463; 358/339, 336, 405; 360/33.1; 364/916.9; 371/42, 35

[56] References Cited

U.S. PATENT DOCUMENTS

| | | | |
|---|---|---|---|
| 4,636,858 | 1/1987 | Hague et al. ............................ | 348/463 |
| 4,703,511 | 10/1987 | Conoval .................................. | 382/232 |
| 5,146,325 | 9/1992 | Ng ............................................ | 348/463 |
| 5,247,363 | 9/1993 | Sun et al. ................................ | 358/336 |
| 5,321,521 | 6/1994 | Nomizu .................................... | 382/232 |
| 5,377,051 | 12/1994 | Lane et al. ............................. | 360/33.1 |
| 5,438,427 | 8/1995 | Yoshida .................................... | 358/405 |
| 5,488,482 | 1/1996 | Ueda et al. .............................. | 358/339 |

*Primary Examiner*—Jose L. Couso
*Assistant Examiner*—Anh Hong Do
*Attorney, Agent, or Firm*—Fitzpatrick, Cella, Harper & Scinto

[57] ABSTRACT

An image signal is divided into blocks and encoded in a plurality of encoding modes by different encoding operations, and mode information indicative of an encoding mode with respect to the block are input. A check is made to see if the input mode information is erroneous or not. The input image signal is decoded by using mode information generated for the erroneous mode information in accordance with the mode information of blocks neighboring the block corresponding to the detected erroneous mode information, thereby enabling a preferred image to be obtained even though there is an error in the input mode information.

23 Claims, 5 Drawing Sheets

IMAGE PROCESSING APPARATUS

This application is a continuation of application Ser. No. 08/493,999, filed Jun. 23, 1995 now abandoned.

BACKGROUND OF THE INVENTION

1. Field of the Invention

The present invention relates to an image processing apparatus and, more particularly, to an apparatus for obtaining a reproduction image by encoding and transmitting an image signal and decoding the encoded signal on the reception side.

2. Related Background Art

In the field of a digital transmission of a moving picture, studies of an image encoding technique are actively performed and an apparatus for obtaining a reproduction image by decoding an image signal encoded by a motion compensation prediction encoding which performs a preferable image transmission even at a low data rate is realized.

Image data that is handled in such type of apparatus is encoded by using an intrafield encoding in which image data of one picture plane is encoded only by data in the same picture plane, a prediction encoding in which interfield differential data and interframe differential data between the picture planes which are different with respect to a time are encoded, or the like.

When the image data encoded as mentioned above and encoding mode data are transmitted through a transmission line and are decoded on the reception side, an error occurring in the data in the transmission line is corrected and the corrected data is decoded. However, there is a case which occurs where an error which cannot be corrected by such an error correction occurs. When the error cannot be corrected, a decoding apparatus cannot accurately decode the image data even when the uncorrectable error is any one of the encoded image data and the data in the encoding mode. In such a case, the uncorrectable encoded image data or the encoding mode data is forcedly replaced to predetermined data, thereby concealing the image data.

In such type of apparatus, since the concealed image becomes a reference image when executing the decoding operation to the next and subsequent picture planes, in the case where the uncorrectable error occurs in the encoding mode data and the data is concealed in a specific encoding mode, the concealed image is often different from the actual reference image, so that an error from the actual image data appears in the decoded image and the reproduction image deteriorates.

SUMMARY OF THE INVENTION

An object of the invention is to solve the above-mentioned problems.

Another object of the invention is to provide an apparatus which obtains an image with less deterioration in picture quality even in the case where an uncorrectable error occurs in encoded data.

To accomplish the above objects, according to an embodiment of the invention, there is provided an image processing apparatus comprising input means for inputting an image signal which is divided into blocks and encoded by a plurality of encoding modes of different encoding operations and mode information indicative of the encoding modes with respect to the blocks error detecting means for detecting whether the mode information inputted by the input means is erroneous or not, generating means for generating mode information for the erroneous information in accordance with the mode information of the blocks around a block according to the erroneous mode information detected by the detecting means, and decoding means for decoding the input image signal by using the mode information generated by the generating means.

The above and other objects and features of the present invention will become apparent from the following detailed description and the appended claims with reference to the accompanying drawings.

DETAILED DESCRIPTION OF THE PREFERRED EMBODIMENT

An embodiment of the invention is described in detail hereinbelow with reference to the drawings.

Figure 1:
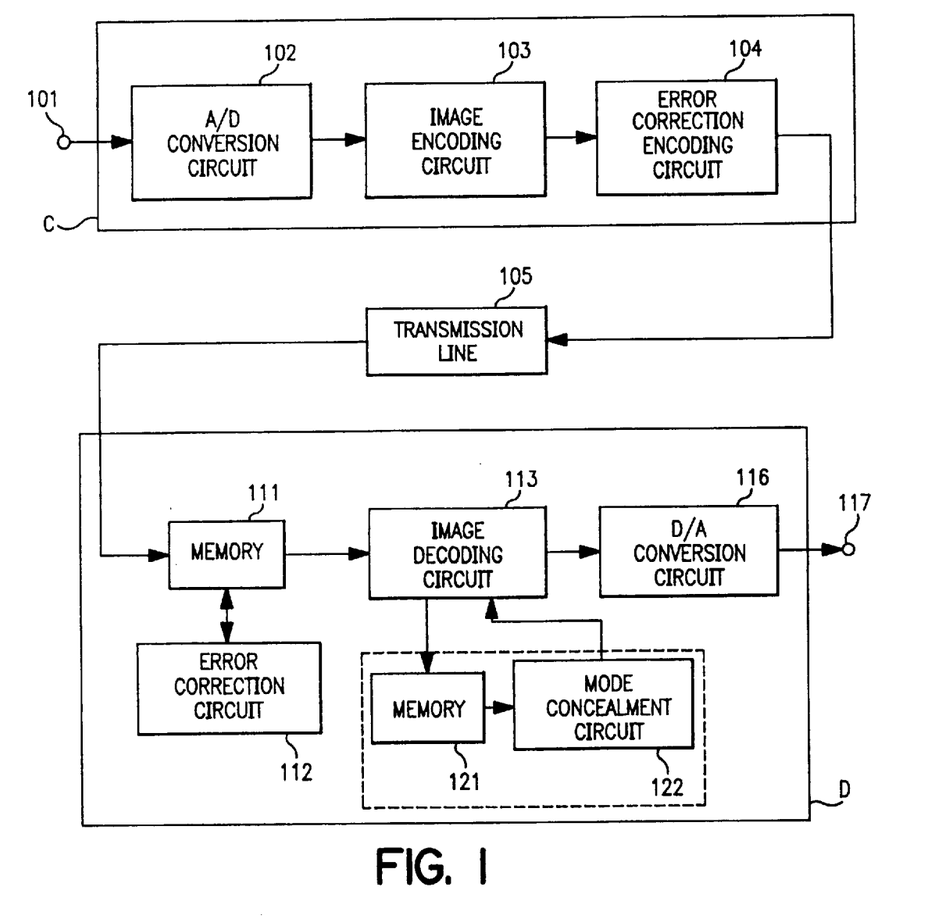
FIG. 1 is a diagram showing a construction of an image processing apparatus as an embodiment of the invention.

FIG. 1 is a block diagram showing a construction of an encoding apparatus and a decoding apparatus as an embodiment of the invention. First, the operation of the encoding apparatus (C) in FIG. 1 is described.

An analog image signal inputted from an input terminal 101 is converted to a digital image signal by an A/D conversion circuit 102. The digital image signal is further divided into blocks each comprising eight pixels in the horizontal direction and eight lines in the vertical direction. The digital image signal which is divided into the blocks is encoded by an image encoding circuit 103 as described hereinlater. After an information amount of the signal is compressed, the signal is outputted to an error correction encoding circuit 104. The error correction encoding circuit 104 performs an error correction encoding by adding parity data to encoded image data and encoding mode data outputted from an image decoding circuit 113 and outputs to a decoding apparatus (D) through a magnetic recording and reproducing system in a VTR and a transmission line 105 such as radio, or the like.

The operation of the image encoding circuit 103 in the embodiment is described below.

In the embodiment, the image encoding circuit 103 and image decoding circuit 113 perform the encoding and decoding operations adapted to an MPEG (Moving Picture coding Expert Group). The encoding and decoding in the MPEG is described hereinbelow.

MPEG data is based on the international standard for performing a high efficiency encoding of a moving picture. Frequency characteristics of data and perceptive characteristics of a human being are utilized and a redundancy in the time base direction is used, thereby performing the high efficient encoding.

A principle of the high efficient encoding method by the MPEG is described below.

In the high efficient encoding method, by obtaining a difference between frames, a redundancy in the time base direction is reduced. The differential data obtained is subjected to DCT and a variable length encoding process and redundancy in the space direction is reduced, thereby realizing the high efficient encoding as a whole.

As for the redundancy in the time base direction, attention is paid to the fact that a correlation of continuous frames is high in case of the moving picture, and a difference between a frame to be encoded and a frame that is preceding or subsequent to such a frame with respect to time is obtained, thereby enabling the redundancy to be reduced.

Figure 2:
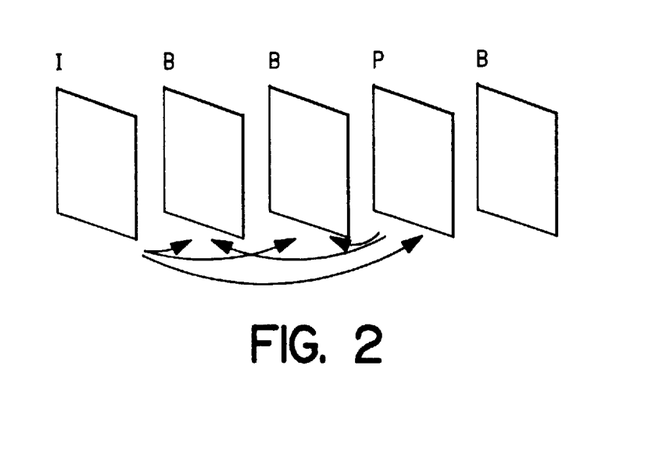
FIG. 2 is a diagram for describing images which are handled in the apparatus of FIG. 1.

As shown in FIG. 2, the MPEG has: an intrafield encoded image (I-picture) obtained in the encoding mode for encoding only in the self frame, a forward prediction encoded image (P-picture) obtained by encoding a differential value between the frame to be encoded and the frame which is preceding such frame with respect to the time; and a bidirectional prediction encoded image (B-picture) obtained by encoding the differential value of the smallest data amount among a differential value between the frame to be encoded and the frame which is preceding or subsequent to such a frame with respect to time and a differential value between the frame to be encoded and an interpolation frame derived from both of the preceding and subsequent frames. The frames in those encoding modes are combined in accordance with a predetermined order. In each of the above prediction encoding modes, interfield and interframe prediction encoding modes are further selectively used. For example, in case of encoding the B-picture, the following four kinds of prediction encoding modes are selectively used on a block unit basis in one picture plane: namely, an intrafield encoding which doesn't use a prediction from the preceding and subsequent picture planes; a forward direction prediction encoding to encode by predicting from a past reproduction image; an inverse direction prediction encoding to encode by predicting from a future image; and an interpolation prediction encoding to encode by predicting from both of the preceding and subsequent picture planes.

In MPEG, one picture plane of the foregoing I-picture, four picture planes of the P-picture, and ten picture planes of the B-picture are set to one unit (GOP: Group of Pictures), respectively, and a combination such that the I-picture is arranged at the head and subsequently two B-pictures and one P-picture are repeatedly arranged is recommended. By arranging the I-picture at every predetermined period, a special reproduction such as reverse reproduction, fast-forward, or the like or a partial reproduction on the GOP unit basis is executed, thereby also preventing error propagation.

When a new object appears in a frame, there is a case such that by obtaining the difference between the frame to be encoded and the frame which is subsequent to such frame with respect to time rather than by obtaining the difference between the frame to be encoded and the preceding frame, the difference value decreases.

Therefore, the bidirectional prediction encoding as mentioned above is executed in MPEG, thereby executing compression at a higher efficiency.

In MPEG, motion compensation is also performed.

That is, (eight pixels×eight pixels) of the input image are set to one block. Four blocks are collected with respect to luminance data and two blocks are collected with regard to color difference data. The collected six blocks construct a predetermined block (macro block). A difference between the block to be encoded and the macro block near the corresponding block in the preceding or subsequent frame is obtained on the unit basis of such a predetermined block (macro block). The macro block having the smallest difference is searched, thereby detecting a motion vector. The encoding operation is performed by using the motion vector as data.

In case of decoding, the corresponding macro block data in the preceding or subsequent frame is extracted by using the motion vector, thereby decoding the encoded data which was encoded by using the motion compensation.

In such motion compensation, the frame which is preceding with respect to time is once encoded and, after that, it is again decoded. The resultant decoded frame is set to the preceding frame. The motion compensation is executed by using the macro block in such a preceding frame and a macro block in the frame to be encoded.

The differential data and the motion vector obtained by the above-mentioned motion compensation are further high efficient encoded by a discrete cosine transformation (hereinafter, referred to as a "DCT"), a quantization, and a variable length encoding.

A data structure in the MPEG system is described below.

Figure 3:
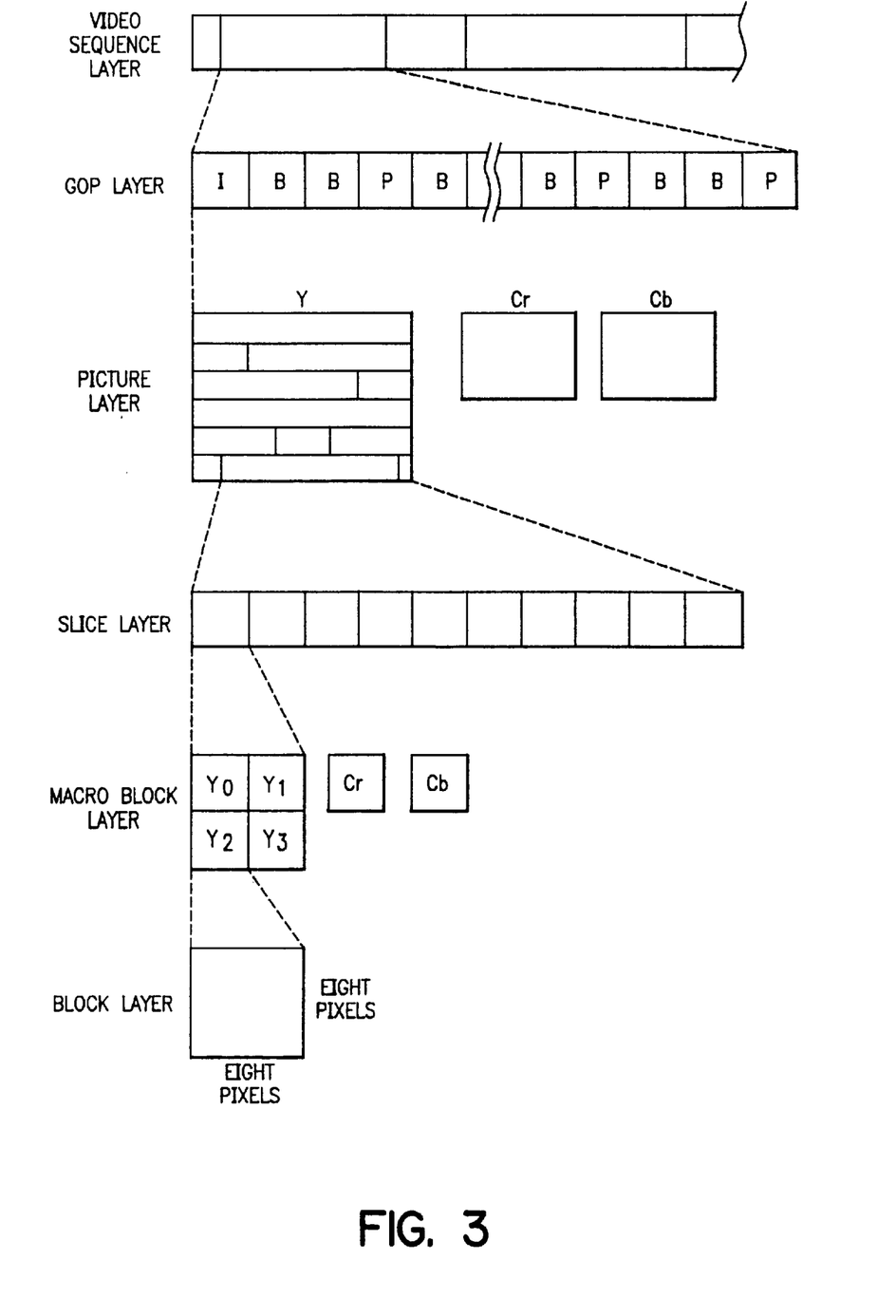
FIG. 3 is a diagram for describing images which are handled in the apparatus of FIG. 1.

As shown in FIG. 3, the data structure is constructed by a hierarchy structure comprising a video sequence layer, a GOP layer, a picture layer, a slice layer, a macro block layer, and a block layer.

The layers are described hereinbelow in accordance with the order from the lowest layer in the drawing.

The block layer is constructed by (eight pixels×eight pixels) every luminance data and every color difference data, respectively. The DCT is performed on such unit basis.

The macro block layer is constructed in a manner such that a macro block header is added to the foregoing macro block comprising four blocks with respect to the luminance data and one block with respect to the color difference data [in which each block consists of (eight pixels×eight pixels)] as mentioned above. In the MPEG system, the macro block is set to a unit of the motion compensation and the encoding, which is described hereinafter. The macro block header includes each data of the motion compensation and the quantization step of each macro block unit and data indicating whether six DCT blocks (Y0, Y1, Y2, Y3, Cr, and Cb) in each macro block have data or not.

The slice layer is constructed by one or more macro blocks which are continuous in accordance with the scan order of the image and a slice header. The quantization steps in a series of macro blocks in the same slice layer can be made uniform. The slice header has data regarding the quantization steps in each slice layer. When there is no peculiar quantization step data in each macro block, the quantization steps in the slice layer are uniform. In the head macro block, a differential value of D/C components is reset.

The picture layer is obtained by collecting a plurality of the above-mentioned slice layers on a one frame unit basis and is constructed by: a header comprising a picture start code and the like; and one or a plurality of slice layers subsequent to the header. The header includes a code indicative of the encoding mode of the image and a code indicative of a motion detecting precision (whether the motion detection is performed by a pixel unit or a half pixel unit).

The GOP layer is constructed by: a header comprising a group start code, a time code indicative of the time from the beginning of the sequence, and the like; and a plurality of I, B, and P frames subsequent to the header.

The video sequence layer starts with a sequence start code and ends with a sequence end code. The control data such as image size, aspect ratio, and the like which are necessary for decoding and a plurality of GOPs each having the same image size and the like are arranged between the sequence start code and the sequence end code.

In an MPEG system having such a data structure, a bit stream is specified by its standard.

The construction of the image encoding circuit 103 which handles the MPEG data as mentioned above is described with reference to FIG. 4.

Figure 4:
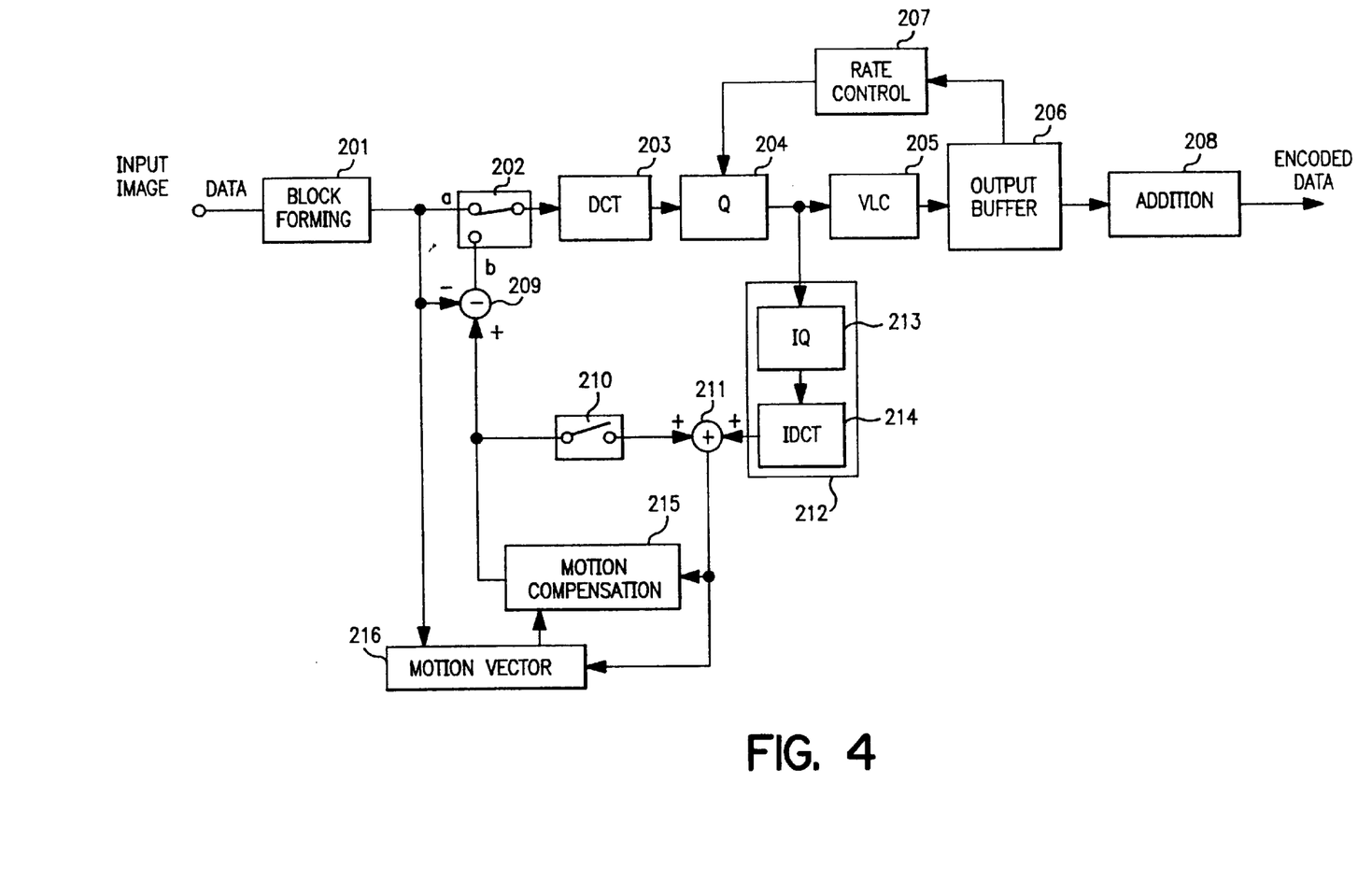
FIG. 4 is a block diagram showing a construction of an image encoding circuit in the apparatus of FIG. 1.

FIG. 4 is a block diagram showing the construction of the image encoding circuit 103. As shown in FIG. 4, the image encoding circuit 103 is schematically constructed by a block forming circuit 201, a DCT circuit 203, a quantization (Q) circuit 204, a variable length coding (VLC) circuit 205, a motion compensation circuit 215, a motion vector detection circuit 216, a rate control circuit 207, a local decoder 212, an output buffer 206 and the like.

In FIG. 4, the image data inputted from the A/D conversion circuit 102 in FIG. 1 is divided into blocks each consisting of (eight pixels×eight pixels), as mentioned above, by the block forming circuit 201 and is transmitted to the DCT circuit 203 through a switch 202.

The switch 202 is switched depending on whether the input image data is an intraframe (I frame) or another frame (P or B frame). In the case of the intraframe, the switch is connected to an (a) contact. In the other cases, the switch 202 is connected to a (b) contact.

In the case of the intraframe, the data is discrete cosine transformed by the DCT circuit 202, thereby converting from data in the space area to data in the frequency area. DCT coefficients obtained by such a transformation are quantized by the quantization circuit 204. The quantized date is variable length encoded by the variable length coding circuit 205 and, after that, the data is stored once in the buffer 206.

In case of a frame other than the intraframe, on the other hand, the switch 202 is connected to the contact (b) and the motion compensation described above is performed. That is, reference numeral 213 denotes an inverse quantization circuit and reference numeral 214 denotes an inverse DCT circuit, and those circuits construct the local decoder 212. The data quantized by the quantization circuit 204 is inputted to the local decoder 212 to reproduce the original image.

Reference numeral 211 denotes an adder, 210 a switch which is closed only in case of the frame other than the intraframe, and 209 a subtractor. With respect to the locally decoded image data, the corresponding macro block in a predetermined frame (preceding frame, subsequent frame, or interpolation frame of the preceding and subsequent frames) or a field is outputted by referring to the motion vector detected by the motion vector detection circuit 216.

A subtracting process between the output of the motion compensation circuit 215 and the input image data is executed by the subtractor 209, thereby obtaining a differential value. The differential value is encoded by the foregoing DCT circuit 203, quantization circuit 204, and variable length coding circuit 205 and the encoded value is stored into the buffer 206.

The motion vector detection circuit 216 obtains a motion vector by comparing frame data to be encoded from now on and predetermined reference frame data. A detection output of the detection circuit 216 is supplied to the motion compensation circuit 215 and the motion compensation circuit 215 designates the macro block to be outputted. The rate control circuit 207 controls a code amount by switching the quantization steps in the quantization circuit 204 on the basis of an occupancy amount of the encoded data in the buffer 206.

An addition circuit 208 finally adds the various headers as mentioned above to the encoded data and transmits the resultant data as MPEG data corresponding to the MPEG system. Although the encoding mode in one picture plane of the image data encoded as mentioned above is identical for the I, P, and B pictures, the encoding mode is different every macro block in each mode as mentioned above.

The operation on the reception side is described below. On the reception side, the data transmitted through the transmission line 105 is stored once in a memory 111. An error correcting process using the foregoing parity data is executed on the encoded image data and the encoding mode information, respectively, by an error correction circuit 112 which accesses the memory 111. Error information (error flag) is added to each of the encoded image data and the encoding mode information on a block unit basis by the process of the error correction circuit 112. The resultant image data and encoding mode information are inputted from the memory 111 to the image decoding circuit 113. The operation of the image decoding circuit 113 is described hereinbelow.

Figure 5:
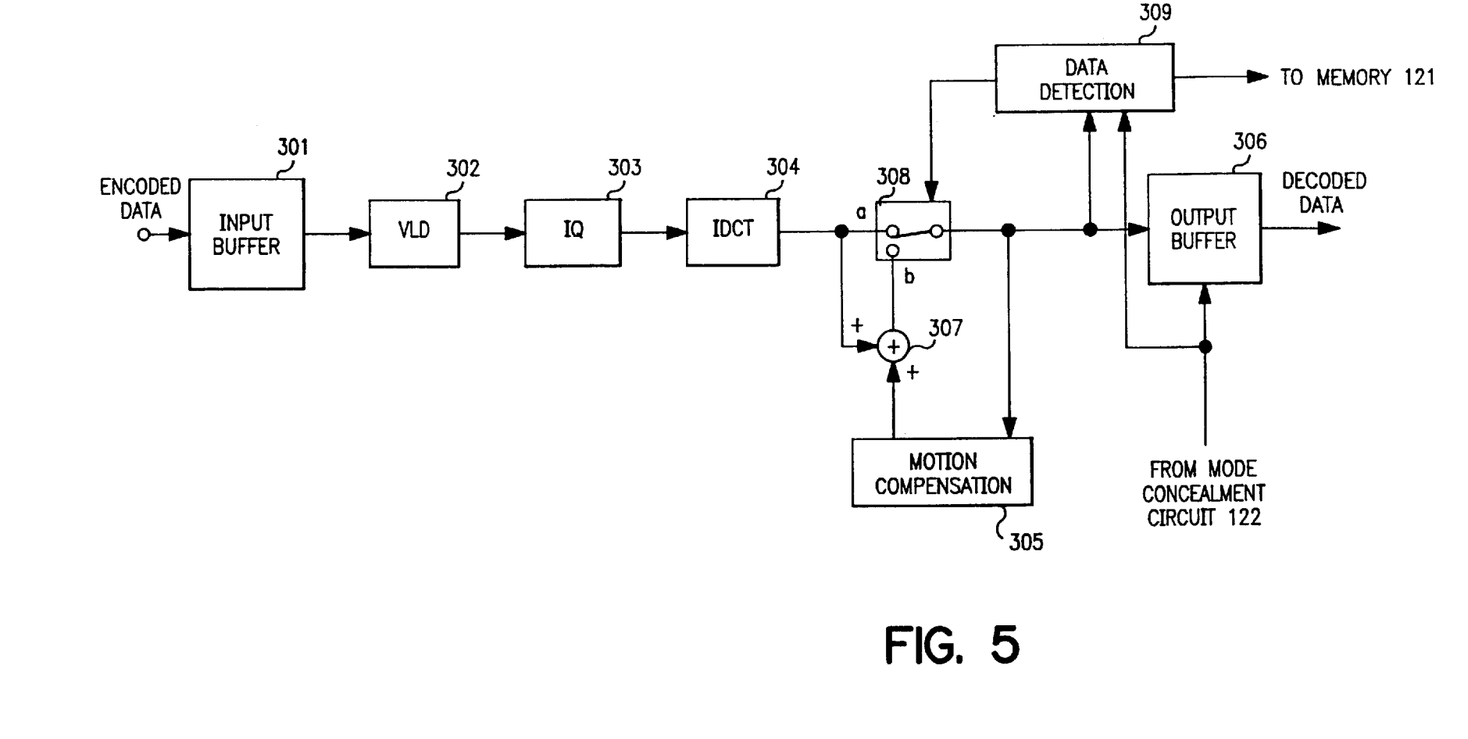
FIG. 5 is a block diagram showing a construction of an image decoding circuit in the apparatus of FIG. 1.

The image decoding circuit 113 fundamentally executes an operation opposite to the above-mentioned encoding and, as shown in FIG. 5, comprises an input buffer 301, a variable length code decoding (VLD) circuit 302, an inverse quantization (IQ) circuit 303, an inverse DCT (IDCT) circuit 304, a motion compensation circuit 305, an output buffer 306, and the like.

That is, the encoded image data which is corrected by the error correction circuit 112 and outputted from the memory 111 is stored in the input buffer 301. The encoded data read out from the input buffer 301 is converted to in the space area according to the data before encoding by the variable length code decoding circuit 302, inverse quantization circuit 303 and inverse DCT circuit 304.

Reference numeral 307 denotes an adder for adding a differential value which is outputted from the motion compensation circuit 305 to an output from the inverse DCT circuit 304. Reference numeral 308 indicates a switch to select one of the output of the inverse DCT circuit 304 and an output of the adder 307. The switch 308 is switched on the basis of the encoding mode information detected by a data detection circuit 309. In case of the intraframe, the switch 308 is connected to an (a) side. In case of a frame other than the Intraframe, the switch 308 is connected to a (b) side. When there is an instruction to rewrite the encoding mode information from a mode concealment circuit 122, the data detection circuit 309 switches the switch 308 in accordance with the instruction.

The data decoded as mentioned above is stored once in the output buffer 306 and is further returned to the data of the original pixel arrangement The resultant data is outputted to a D/A conversion circuit 116. The encoding mode information in the output buffer 306 is concealed (rewritten) by the mode concealment circuit 122 as is described hereinafter and is outputted.

Reference numeral 121 denotes a memory to store the mode information of one frame and the error flag and reference numeral 122 denotes the mode concealment circuit to conceal the mode information by using the mode information and error flag.

The mode information and error flag are inputted from the image decoding circuit 113 to the memory 121. The mode information and the error flag are inputted from the memory 121 to the mode concealment circuit 122. The concealed mode information and the error flag or the mode information which is not concealed and the error flag are inputted from the mode concealment circuit 122 to the image decoding circuit 113.

Such an operation is described hereinbelow.

The error flag (it is assumed that "1" indicates the presence of an error and "0" indicates no error) regarding the encoding mode information and the encoding mode information which were outputted from the image decoding circuit 113 on a block unit basis are written in the memory 121. The error flags and the encoding mode information of the block to be decoded by the image decoding circuit 113 and eight blocks neighboring the block to be decoded are outputted from the memory 121 to the mode concealment circuit 122. When the error flag of the encoding mode information of the block to be processed is equal to "1", since this means that uncorrectable errors still exist in such a block, the mode concealment circuit 122 checks the error flags and the encoding mode information of the eight blocks neighboring the block which includes the errors (hereinafter, such a block is referred to as an "error block") and the concealing operation is executed.

For example, when the image of one picture plane is divided into small blocks each consisting of (8 pixels×8 lines) as mentioned above, (16 pixels×16 lines), or the like and is processed, and in many cases, a plurality of encoding modes are identical in some collected blocks. For example, when the object suddenly moves a large amount, the blocks regarding such an object are likely to be processed in the intrafield encoding mode and the other blocks are likely to be processed in the interframe prediction encoding mode or the interfield prediction encoding mode. In the embodiment, therefore, when there is no error in the error flag of each of the eight blocks neighboring the error block and the encoding mode information indicates the same encoding mode, the encoding mode of the error block is set to the same encoding mode as that of each of the neighboring blocks and the encoding mode information indicating such a fact is outputted to the image decoding circuit 113. The error flag is also changed to "0" together with the concealing operation of the encoding mode information and is outputted. Namely, the relevant encoding mode information in the buffer memory 306 of the image decoding circuit 113 is rewritten and a signal indicative of such a fact is also outputted to the data detection circuit and the switch 308 is switched.

Figure 6:
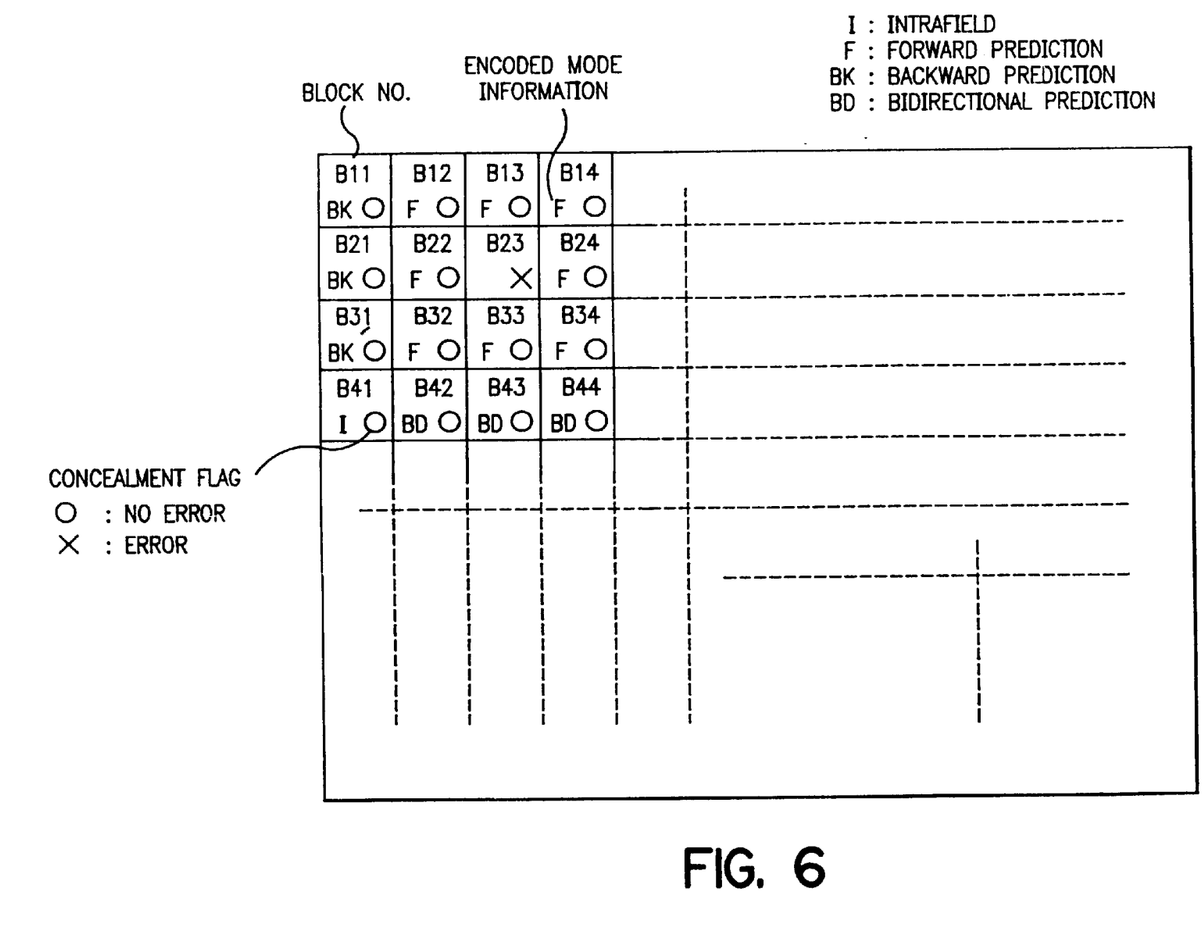
FIG. 6 is a diagram for describing the operation of a mode concealment circuit in the apparatus of FIG. 1.

Such a situation is shown in FIG. 6. FIG. 6 shows a case where the image of the B-picture is divided into a plurality of blocks. The numeral in each block in the diagram indicates a block number; I, F, BK, and BD indicate the encoding modes; and "o" and "X" indicate whether there are uncorrectable errors or not, namely, whether the block is the error block or not. There are now four encoding modes such as intrafield encoding, forward prediction encoding, backward prediction encoding, and bidirectional prediction encoding. All of the prediction encodings assume interframe prediction encoding.

In the diagram, for instance, there is an error in a block of B23 and there is no error in the neighboring eight blocks B12, B13, B14, B22, B24, B32, B33, and B34. When those eight blocks are encoded in the forward prediction encoding mode, it is judged that the encoding mode of the B23 block is the forward prediction encoding mode, the error flag is set to "0" and the encoding mode information and the error flag are outputted to the image decoding circuit 113.

When even one of the neighboring eight blocks has an error in the encoding mode information or has a different encoding mode, the mode information and the error flag are outputted as they are to the image decoding circuit 113.

When there is no error in the encoding mode information, the encoding mode information and the error flag are outputted as is the image decoding circuit 113.

The decoding circuit 113 decodes the encoded image data on the basis of the encoding mode information and the error flag which were outputted from the mode concealment circuit 122. In the case where the error flag outputted from the mode concealment circuit 122 is further equal to "1", namely, in the case where there is an error in the encoding mode information of the blocks neighboring the error block or the encoding mode information of the blocks is different, the image decoding circuit 113 forcedly performs the decoding operation in the interfield encoding mode by regarding that there is no motion. When there is no error in the encoding mode information, the encoded image data is decoded by using the input correct encoding mode information.

According to the embodiment as described above, since the encoding mode of the error block is detected on the basis of the encoding mode information of the blocks neighboring the error block, even in the case where the encoding mode information is not obtained, an error between the decoded image and the actual image is reduced, so that a reproduction image with less deterioration in a picture quality is obtained.

Although the encoding mode information is described in the above embodiment, the invention can also be applied to the motion vector for a motion compensation prediction in a similar manner.

Although the case where each of the I, B, and P pictures is identical in one picture plane is described in the above embodiment, the invention can also be applied to the case where the respective encoding modes mixedly exist in one picture plane and a similar operation and effect are obtained in such a case.

As a transmission line in the above embodiment, various modes such as digital VTR for digitizing an image signal and recording and reproducing the digital data to/from a tape, case where the encoded image signal is transmitted and received by radio waves or the like can be considered. Any mode can be used as long as the image signal is encoded in a plurality of encoding modes and transmitted.

Further, in the foregoing embodiment, although the encoding mode information is concealed only in the case where there is no error in all of the encoding mode information of the blocks neighboring the error block and the all of the encoding modes are identical, the invention is not limited to such a case but it is also possible to use only the encoding mode information having no error or to conceal the encoding mode to the encoding mode having the highest rate among the encoding modes of the neighboring blocks.

Although the invention is described above on the basis of the preferred embodiments, the present invention is not limited to the foregoing embodiments, and many modifications and variations are possible within the spirit and scope of the appended claims of the invention.

What is claimed is:

1. A decoding apparatus for decoding an image signal which is divided into blocks each of which comprises the image signal representing a plurality of pixels, and encoded in block units by encoding operations of a plurality of encoding modes different from each other, comprising:

(a) receiving means for receiving mode information indicative of said encoding modes of said blocks together with the encoded image signal from a transmission path;

(b) error detecting means for detecting transmission errors in the mode information received by said receiving means together with the image signal;

(c) modifying means for replacing the mode information including the transmission error detected by said error detecting means with other mode information indicative of encoding modes of blocks around a block corresponding to the erroneous mode information; and (d) decoding means for decoding the image signal received by said receiving means according to the mode information, said decoding means decoding the encoded image signal of the block corresponding to the erroneous mode information according to the mode information modified by said modifying means.

2. An apparatus according to claim 1, wherein said modifying means includes means for detecting an error state of the mode information of said neighboring blocks and generates mode information for said erroneous mode information in accordance with the error states of said neighboring blocks.

3. An apparatus according to claim 2, wherein said modifying means generates mode information indicative of the same encoding mode in accordance with a fact that there is no error in the mode information of all of said neighboring blocks and the mode information of all of said neighboring blocks indicates said same encoding mode.

4. An apparatus according to claim 1, wherein said modifying means generates the mode information for said erroneous mode information in accordance with the mode information of the block in which the mode information is not erroneous among said neighboring blocks.

5. An apparatus according to claim 1, wherein said modifying means generates the mode information indicative of the encoding mode indicated by the largest number of mode information of said neighboring blocks among said plurality of encoding modes.

6. An apparatus according to claim 1, wherein said image signal is encoded by using signals of a plurality of different picture planes.

7. An apparatus according to claim 6, wherein said image signal is encoded by selectively using a first mode for encoding by using only the image signals of the picture plane including said image signal, a second mode for encoding by using the image signals of the picture plane including said image signal and the image signals of the preceding picture plane of said picture plane, and a third mode for encoding by using the image signals of the picture plane including said image signal and the image signals of the preceding and subsequent picture planes of said picture plane, and said mode information indicates that said image signal has been encoded in which one of said first, second, and third encoding modes.

8. A decoding apparatus for decoding an image signal which is divided into blocks each of which comprises the image signal representing a plurality of pixels, and encoded in block units by encoding operations of a plurality of encoding modes different from each other, comprising:

(a) receiving means for receiving mode information indicative of said encoding modes with respect to said blocks together with the encoded image signal from a transmission path;

(b) decoding means for decoding the encoded image signal received by said receiving means according to the mode information received by said receiving means together with the encoded image signal; and (c) control means for controlling said decoding operation of said decoding means,
wherein said control means controls said decoding means so that the image signal of a target block is decoded according to the encoding mode indicated by the mode information of blocks around the target block.

9. An apparatus according to claim 8, wherein said mode detecting means detects said encoding mode on said block unit basis.

10. An apparatus according to claim 8, wherein said mode detecting means includes means for inputting the mode information indicative of the encoding mode of said received image signal and outputs the mode information for the plurality of blocks around said target block.

11. An apparatus according to claim 10, wherein said decoding means includes generating means for generating mode information for said target block in accordance with the mode information of the plurality of blocks around said target block and decodes said target block by using the mode information generated by said generating means.

12. An apparatus according to claim 10, wherein said decoding means includes error detecting means for detecting whether said input mode information is erroneous or not, and said target block is a block corresponding to the erroneous mode information detected by said error detecting means.

13. An apparatus according to claim 8, wherein said image signal has been encoded by selectively using a first mode for encoding by using only the image signals of one picture plane and a second mode for encoding by using the image signals of a plurality of picture planes.

14. A decoding apparatus for decoding an image signal which is divided into blocks each of which comprises the image signal representing a plurality of pixels, and encoded in block units by encoding operations of a plurality of encoding modes different from each other, comprising:

receiving means for receiving mode information indicative of said encoding modes of said blocks together with the encoded image signal from a transmission path;

error correcting means for correcting transmission errors in the mode information received by said receiving means together with the encoded image signal and generating an error signal indicating the transmission error which cannot be corrected by said error correction operation;

decoding means for decoding the encoded image signal received by said receiving means according to the mode information received by said receiving means together with the encoded image signal; and control means for controlling said decoding operation of said decoding means according to the error signal generated by said error correcting means, wherein said control means controls said decoding means so that the image signal of a block corresponding to mode information including the transmission error which cannot be corrected by said error correction operation, is decoded according to the encoding mode indicated by the mode information of blocks surrounding said block corresponding to the mode information including the uncorrectable error.

15. An apparatus according to claim 14, wherein the plurality of encoding modes include an intra-picture encoding mode in which encoding is performed by using an image signal of only one picture, and an inter-picture encoding mode in which encoding is performed by using an image signal of a plurality of pictures.

16. An apparatus according to claim 14, wherein the plurality of encoding modes include an intra-picture encoding mode in which encoding is performed by using an image signal of only one picture, a forward prediction encoding mode in which prediction encoding is performed by using image signals of a subject image and a preceding image thereof, and bidirectional prediction encoding mode in which prediction encoding is performed by using image signals of the subject image and preceding any subsequent images thereof.

17. An apparatus according to claim 14, wherein the image signal includes a plurality of macro-blocks each comprising "n" luminance blocks and "m" color difference blocks.

18. An apparatus according to claim 14, wherein said error correcting means also corrects the transmission error in the encoded image signal received by said receiving means.

19. A decoding method of decoding an image signal which is divided into blocks each of which comprises the image signal representing a plurality of pixels, and encoded in block units by encoding operations of a plurality of encoding modes different from each other, comprising:

a receiving step of receiving mode information indicative of the encoding modes of the blocks together with the encoded image signal from a transmission path;

an error correcting step of correcting transmission errors in the mode information received in said receiving step together with the encoded image signal and generating an error signal indicating the transmission error which cannot be corrected by the error correction operation;

a decoding step of decoding the encoded image signal received in said receiving step according to the mode information received in said receiving step together with the encoded image signal; and a control step of controlling the decoding operation of said decoding step according to the error signal generated in said error correcting step, wherein said control step includes controlling the decoding operation of said decoding step so that the image signal of a block corresponding to mode information including the transmission error which cannot be corrected by the error correction operation, is decoded according to the encoding mode indicated by the mode information of blocks surrounding the block corresponding to the mode information including the uncorrectable error.

20. A method according to claim 19, wherein the plurality of encoding modes include an intra-picture encoding mode in which encoding is performed by using an image signal of only one picture, and an inter-picture encoding mode in which encoding is performed by using an image signal of a plurality of pictures.

21. A method according to claim 19, wherein the plurality of encoding modes include an intra-picture encoding mode in which encoding is performed by using an image signal of only one picture, a forward prediction encoding mode in which prediction encoding is performed by using image signals of a subject image and a preceding image thereof, and bidirectional prediction encoding mode in which prediction encoding is performed by using image signals of the subject image and preceding any subsequent images thereof.

22. A method according to claim 19, wherein the image signal includes a plurality of macro-blocks each comprising "n" luminance blocks and "m" color difference blocks.

23. A method according to claim 19, wherein said error correcting step includes correcting the transmission error in the encoded image signal received in said receiving step.

* * * * *

UNITED STATES PATENT AND TRADEMARK OFFICE
CERTIFICATE OF CORRECTION

PATENT NO. : 5,991,445

DATED : November 23, 1999

INVENTOR(S) : MASATO KATO

It is certified that error appears in the above-identified patent and that said Letters Patent is hereby corrected as shown below:

COLUMN 1

Line 34, "correction occurs." should read --correction.--.

COLUMN 2

Line 65, "efficient" should read --efficiency--.

COLUMN 3

Line 1, "efficient" should read --efficiency--;
    Line 6, "efficient" should read --efficiency--; and
    Line 18, "the" should be deleted.

COLUMN 4

Line 18, "efficient" should read --efficiency--;
    Line 55, "by:" should read --by--;
    Line 56, "like;" should read --like,--; and
    Line 61, "by:" should read --by--.

COLUMN 6

Line 35, "to" should read --to data--; and
    Line 55, "arrangement" should read --arrangement.--.

UNITED STATES PATENT AND TRADEMARK OFFICE
CERTIFICATE OF CORRECTION

PATENT NO.    : 5,991,445
DATED         : November 23, 1999
INVENTOR(S)   : MASATO KATO It is certified that error appears in the above-identified patent and that said Letters Patent is hereby corrected as shown below:

COLUMN 8

Line 47, "the" (third occurrence) should be deleted.

COLUMN 9

Line 32, "1," should read --2,--.

COLUMN 10

Line 11, "8," should read --9,--.

Signed and Sealed this

Twenty-seventh Day of March, 2001

NICHOLAS P. GODICI

Attest:

Attesting Officer

Acting Director of the United States Patent and Trademark Office